US012676745B2

(12) United States Patent
Lin et al.

(10) Patent No.: US 12,676,745 B2
(45) Date of Patent: Jul. 7, 2026

(54) KEY AUTHENTICATION METHOD, ELECTRONIC DEVICE, AND STORAGE MEDIUM

(71) Applicant: RUIJIE NETWORKS CO., LTD., Fuzhou (CN)

(72) Inventors: Chengjie Lin, Fuzhou (CN); Zhifei Zang, Fuzhou (CN)

(73) Assignee: RUIJIE NETWORKS CO., LTD., Fuzhou (CN)

( * ) Notice: Subject to any disclaimer, the term of this patent is extended or adjusted under 35 U.S.C. 154(b) by 0 days.

(21) Appl. No.: 19/227,635

(22) Filed: Jun. 4, 2025

(65) Prior Publication Data

US 2025/0300824 A1 Sep. 25, 2025

Related U.S. Application Data

(63) Continuation of application No. PCT/CN2024/094715, filed on May 22, 2024.

(30) Foreign Application Priority Data

Aug. 30, 2023 (CN) .......................... 202311108714.X

(51) Int. Cl.
*H04L 9/08* (2006.01)

(52) U.S. Cl.
CPC .................................... *H04L 9/088* (2013.01)

(58) Field of Classification Search
CPC ....................................................... H04L 9/08
See application file for complete search history.

(56) References Cited

U.S. PATENT DOCUMENTS

2010/0164693 A1* 7/2010 Zhang ................. H04L 63/0823
340/10.31
2013/0212656 A1* 8/2013 Ranade ................. H04L 63/083
726/6
(Continued)

FOREIGN PATENT DOCUMENTS

CN 108769058 A 11/2018
CN 110198539 A 9/2019
(Continued)

OTHER PUBLICATIONS

International Search Report and Written Opinion issued on Sep. 17, 2024, in corresponding International Application No. PCT/CN2024/094715, 12 pages.
(Continued)

*Primary Examiner* — Phy Anh T Vu
(74) *Attorney, Agent, or Firm* — Maier & Maier, PLLC

(57) ABSTRACT

A key authentication method, an electronic device, and a storage medium. The key authentication method includes: determining user information based on a key authentication request sent by a user end, where the key authentication request includes the user information and an initial key; determining whether the user information has been bound to a pre-shared key; when the user information has not been bound to a pre-shared key, determining whether the initial key matches a first key, where the first key is used to determine whether the user end has a registration need for a pre-shared key; and when the initial key matches the first key, registering the first pre-shared key for the user end and binding the first pre-shared key to the user information.

15 Claims, 6 Drawing Sheets

(56)            References Cited

U.S. PATENT DOCUMENTS

| | | |
|---|---|---|
| 2017/0359332 A1 | 12/2017 | Hanay et al. |
| 2020/0274707 A1* | 8/2020 | Kiiskilä ............ H04W 12/0431 |
| 2021/0185042 A1* | 6/2021 | Sharma ................ H04L 67/146 |
| 2021/0219353 A1* | 7/2021 | Montemurro ....... H04W 12/069 |
| 2023/0076147 A1* | 3/2023 | Liu ..................... H04W 12/069 |
| 2023/0180001 A1* | 6/2023 | Cho ..................... H04W 12/73 |
| | | 726/2 |

FOREIGN PATENT DOCUMENTS

| | | |
|---|---|---|
| CN | 112566119 A | 3/2021 |
| WO | 2016003311 A1 | 1/2016 |
| WO | 2023090117 A1 | 5/2023 |

OTHER PUBLICATIONS

Office Action issued on Dec. 2, 2025, in corresponding Japanese Application No. 2025-541076, 13 pages.
Extended European Search Report issued on Mar. 13, 2026, in corresponding European Patent Application No. 24857867.6, 9 pages.

* cited by examiner

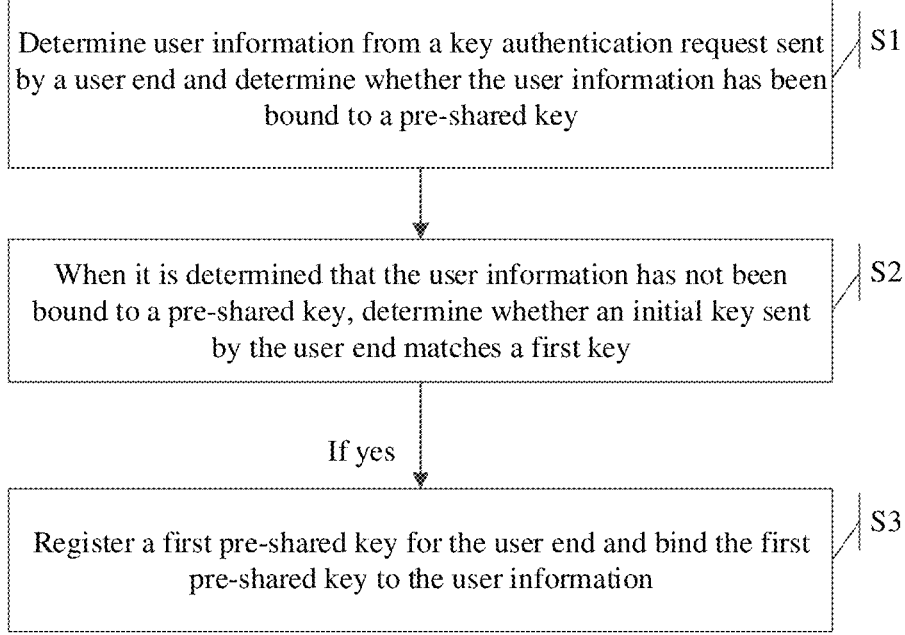

Determine user information from a key authentication request sent by a user end and determine whether the user information has been bound to a pre-shared key — S1

When it is determined that the user information has not been bound to a pre-shared key, determine whether an initial key sent by the user end matches a first key — S2

If yes

Register a first pre-shared key for the user end and bind the first pre-shared key to the user information — S3

FIG. 1

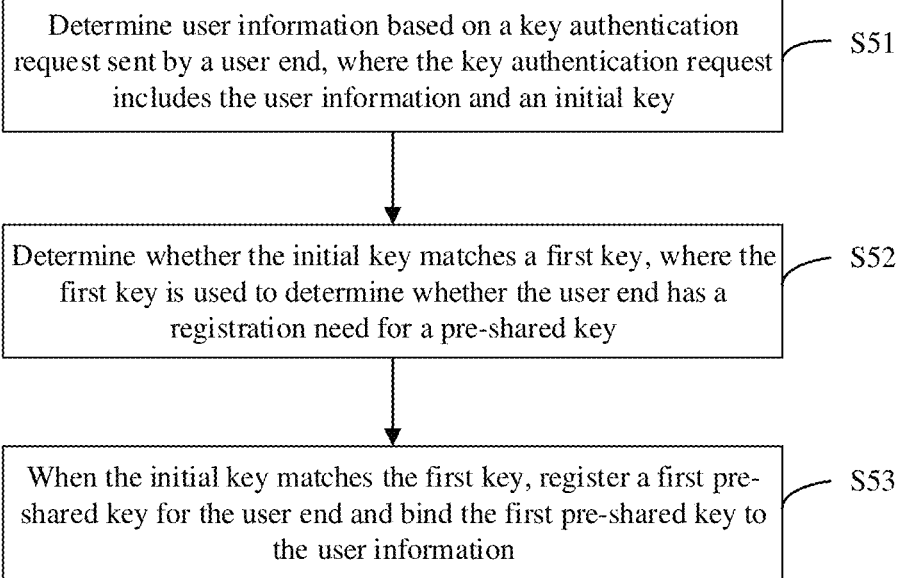

Determine user information based on a key authentication request sent by a user end, where the key authentication request includes the user information and an initial key          S51

Determine whether the initial key matches a first key, where the first key is used to determine whether the user end has a registration need for a pre-shared key          S52

When the initial key matches the first key, register a first pre-shared key for the user end and bind the first pre-shared key to the user information          S53

FIG. 5

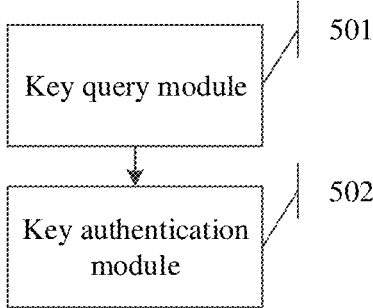

Key query module          501

Key authentication module          502

FIG. 6

KEY AUTHENTICATION METHOD, ELECTRONIC DEVICE, AND STORAGE MEDIUM

CROSS-REFERENCE TO RELATED APPLICATIONS

This application is a continuation of International Patent Application No. PCT/CN2024/094715 filed on May 22, 2024, which claims priority to Chinese Patent Application No. 202311108714.X, filed with the China National Intellectual Property Administration on Aug. 30, 2023 and entitled "KEY AUTHENTICATION METHOD AND APPARATUS, AND ELECTRONIC DEVICE", both of which are incorporated herein by reference in their entireties.

TECHNICAL FIELD

This application relates to the technical field of network security, and in particular, to a key authentication method, an electronic device, and a storage medium.

BACKGROUND

Before terminal equipment accesses a network, a user identity usually needs to be authenticated to restrict an unauthorized user from accessing the network, thereby ensuring operation security of the network.

There are two existing user identity authentication methods: 802.1x authentication and web authentication, but some terminal equipment with wireless network interface cards, for example cameras, game consoles, smart TVs, medical tablet computers, and printers, have no graphical interface, and therefore, may support neither 802.1x authentication nor web authentication. Therefore, in order that the foregoing terminal equipment securely accesses an intranet according to a uniform authentication rule, an authentication method of a pre-shared key (English full name: Pre-Shared Key, PSK for short) may be used.

The PSK authentication is a wireless network-based security authentication method, and when the PSK is used for user identity authentication, an equipment administrator needs to create a unique PSK for each user end and assigns the PSK to the user. When the user accesses a wireless network, the user identity is authenticated based on the PSK input by the user end.

SUMMARY

Exemplary embodiments of this application provide a key authentication method and apparatus, an electronic device, and a storage medium. Specific technical solutions are as follows.

According to a first aspect, this application provides a key authentication method, including:

determining user information based on a key authentication request sent by a user end, where the key authentication request includes the user information and an initial key;

determining whether the initial key matches a first key, where the first key is used to determine whether the user end has a registration need for a pre-shared key; and when the initial key matches the first key, registering a first pre-shared key for the user end and binding the first pre-shared key to the user information.

Based on the foregoing method, the user may register based on the key request, which may avoid manual binding of the pre-shared key to the user information in advance when the user registers, and simplify a registration process.

In a possible implementation, before the determining whether the initial key matches the first key, the method further includes:

determining whether the user information has been bound to a pre-shared key; and when the user information has not been bound to the pre-shared key, determining whether the initial key matches the first key.

Based on the foregoing embodiment, the user may register based on the key request, which may prevent a service authentication end from repeatedly switching between a registration signal and an authentication signal when a new user obtains network access authorization in advance, to achieve functions of pre-shared key registration and authentication based on the same signal.

In a possible implementation, when the user information has been bound to the pre-shared key, it is determined whether the initial key matches a second pre-shared key bound to the user information; and when the initial key matches the second pre-shared key bound to the user information, an authentication message associated with the second pre-shared key is sent to the user end.

In a possible implementation, the authentication message associated with the second pre-shared key includes at least one of authorized virtual local area network information and quality of service information.

In a possible implementation, when the initial key does not match the second pre-shared key bound to the user information, a feedback message indicating an authentication error of the initial key is sent to the user end.

In a possible implementation, the feedback message includes an error type of the authentication error of the initial key.

In this embodiment, the user end can adjust the initial key and perform authentication again based on the error type in the feedback message.

In a possible implementation, the determining whether the initial key matches the second pre-shared key bound to the user information includes:

determining encryption parameter values based on the key authentication request;

encrypting the initial key based on the encryption parameter value to obtain a first encrypted key;

encrypting the second pre-shared key based on the encryption parameter value to obtain a second encrypted key; and when the first encrypted key matches the second encrypted key, determining that the initial key matches the second pre-shared key.

In a possible implementation, when the initial key does not match the first key, the method further includes:

determining whether the initial key matches a second key, where the second key is a pre-shared key in a pre-shared key set; and when the initial key matches the second key, binding the second key to the user information and sending, to the user end, an authentication message associated with the second key.

In this embodiment, the initial key is compared with each second key in a polling method, and therefore, dynamic binding of the pre-shared key to the current user information may be implemented, that is, a function of one key for multiple users, and efficiency of authenticating the user identity is improved.

In a possible implementation, the determining whether the initial key matches the second key includes:

determining encryption parameter values based on the key authentication request;

encrypting the initial key based on the encryption parameter value to obtain a third encrypted key;

determining the second key from the configured pre-shared key set;

encrypting the second key based on the encryption parameter value to obtain a fourth encrypted key;

determining whether the third encrypted key matches the fourth encrypted key; and when the third encrypted key matches the fourth encrypted key, binding the second key to the user information and sending, to the user end, the authentication message associated with the second key.

In a possible implementation, when the third encrypted key does not match the fourth encrypted key, a next candidate pre-shared key is selected from the pre-shared key set as the second key.

In a possible implementation, when the initial key does not match the first key, a second feedback message indicating an authentication failure of the initial key is sent to the user end.

In a possible implementation, the registering the first pre-shared key for the user end and binding the first pre-shared key to the user information includes:

determining registration information sent by the user end;

when determining that the registration information meets a preset registration rule, registering the first pre-shared key for the user end; and sending the first pre-shared key to the user end and binding the first pre-shared key to the user information.

In this embodiment, a registration approval mechanism is configured for the first pre-shared key, which may prevent the user end that does not meet a requirement for pre-shared key registration from registering the pre-shared key, and improve security of pre-shared key registration for the user end.

In a possible implementation, when it is determined that the registration information does not meet the registration rule, a prompt of manual review appears.

In a possible implementation, the registering the first pre-shared key for the user end includes:

sending an accept packet to the user end, where the accept packet includes at least one type of the following information: a registered role, a name of the registered role, a jump address, and a public key; and receiving the registration information sent by the user end and determining the first pre-shared key based on the registration information and a set randomized generation algorithm.

In a possible implementation, after the first pre-shared key is registered for the user end, an offline request is sent to the user end, where the offline request is used to request the user end to discontinue a registration connection.

According to a second aspect, this application provides a key authentication apparatus, including:

a key query module, configured to determine user information from a key authentication request sent by a user end, where the key authentication request includes the user information and an initial key; and a key authentication module, configured to: determine whether the initial key sent by the user end matches a key in a key set of a service authentication end, where the key set of the service authentication end includes a first key and the first key is used to determine whether the user end has a registration need for a pre-shared key; and when the initial key matches the first key, register the first pre-shared key for the user end and bind the first pre-shared key to the user information.

In a possible implementation, the key authentication module is further configured to:

determine whether the user information has been bound to the pre-shared key; and when the user information has not been bound to the pre-shared key, determine whether the initial key matches the first key.

In a possible implementation, the key authentication module is further configured to:

when the initial key does not match the first key, determine whether the initial key matches a second key, where the second key is a pre-shared key in a pre-shared key set;

when the initial key matches the second key, bind the second key to the user information and send, to the user end, an authentication message associated with the second key; and when the initial key does not match the second key, send, to the user end, a first feedback message indicating an authentication failure of the initial key.

In a possible implementation, the key authentication module is specifically configured to:

determine registration information sent by the user end;

determine whether the registration information meets a preset registration rule; and when determining that the registration information meets a registration rule, register the first pre-shared key for the user end; and send the first pre-shared key to the user end and bind the first pre-shared key to the user information.

According to a third aspect, this application provides an electronic device, including:

a memory, configured to store a computer program; and a processor, configured to execute the computer program stored in the memory, to implement steps of the foregoing key authentication method.

According to a fourth aspect, this application provides a computer-readable storage medium, where the computer-readable storage medium stores a computer program, and when the computer program is executed by a processor, the steps of the foregoing key authentication method are implemented.

According to a fifth aspect, this application provides a computer program product, where the computer program product includes a computer program, and when the computer program is executed by a processor, the foregoing key authentication method is implemented.

For each one of the second to fifth aspects and technical effects that may be achieved in each aspect, refer to the foregoing descriptions of the first aspect or technical effects that may be achieved by the various possible solutions in the first aspect. Details are not described herein again.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show merely some of the embodiments of this application, and a person of ordinary skill in the art may still derive other drawings of embodiments from these accompanying drawings without creative efforts. The accompanying drawings herein are incorporated into this specification and form a part of this specification. They illustrate embodiments conforming to this application and are intended to explain the principles of this application together with this specification.

FIG. 1 is a flowchart of a key authentication method according to an embodiment of this application.

FIG. 5 is a flowchart of a key authentication method according to an embodiment of this application.

FIG. 6 is a schematic structural diagram of a key authentication apparatus according to an embodiment of this application.

DETAILED DESCRIPTION OF EMBODIMENTS

Figure 2:
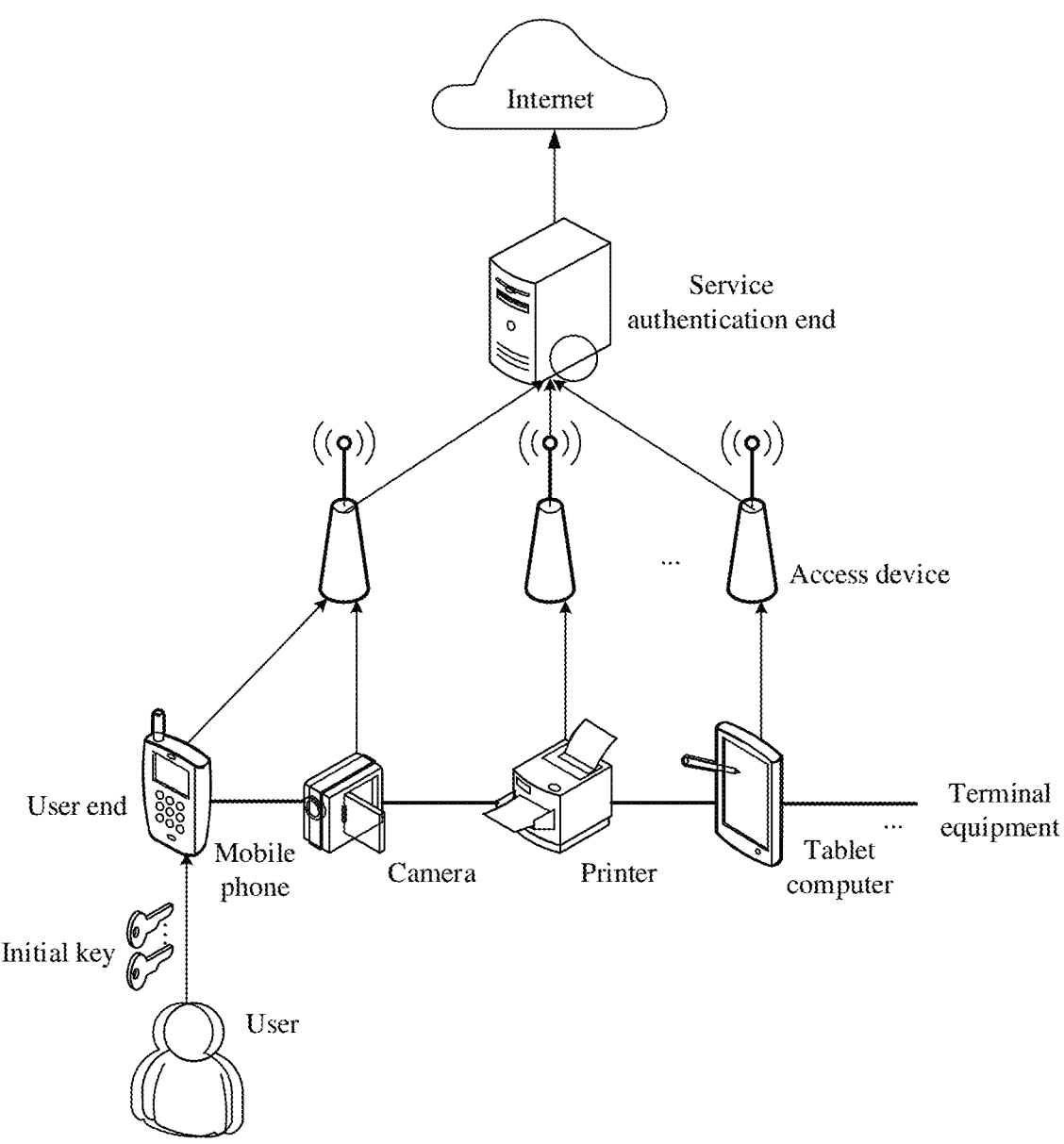
FIG. 2 is a schematic diagram of a key authentication system architecture according to an embodiment of this application.

To make the objectives, technical solutions, and advantages of this application clearer, the following further describes this application in detail with reference to the accompanying drawings. A specific operation method in method embodiments may also be applied to an apparatus embodiment or a system embodiment. It should be noted that "a plurality of" in the descriptions of this application is understood as "at least two". The term "and/or" describes an association relationship between associated objects and represents that three relationships may exist. For example, A and/or B may represent the following three cases: Only A exists, both A and B exist, and only B exists. A connection between A and B may represent two cases: A is directly connected to B, and A is connected to B through C. In addition, in the descriptions of this application, the terms "first", "second", and the like are used only for distinguishing descriptions, but cannot be understood as an indication or implication of relative importance, or as an indication or implication of a sequence.

The following specifically describes the embodiments of this application with reference to the accompanying drawings.

Before terminal equipment accesses a network, a user identity usually needs to be authenticated to restrict an unauthorized user from accessing the network, thereby ensuring operation security of the network.

There are two existing user identity authentication methods: 802.1x authentication and web authentication, but some terminal equipment with wireless network interface cards, for example cameras, game consoles, smart TVs, medical tablet computers, and printers, have no graphical interface, and therefore, may support neither 802.1x authentication nor web authentication. Therefore, in order that the foregoing terminal equipment securely accesses an intranet according to a uniform authentication rule, an authentication method of a pre-shared key may be used.

The PSK authentication is a wireless network-based security authentication method, and when the PSK is used for user identity authentication, an equipment administrator needs to create a unique PSK for each user end and assigns the PSK to the user. When the user accesses a wireless network, the user identity is authenticated based on the PSK input by the user end.

However, before using the PSK authentication method for the user identity authentication, the equipment administrator needs to collect media access control (English: Medium Access Control, MAC for short) address information of each terminal equipment, register PSK information for terminal equipment on which the user end runs, then bind the MAC address information to the PSK information, and deliver a binding result to the terminal equipment.

If the foregoing PSK authentication method is used for identity authentication of a plurality of users, the user needs to input a unique PSK on terminal equipment that has been bound to the PSK information, which limits the use of the PSK, increases difficulty of maintaining the PSK configuration information of a plurality sets of terminal equipment by the equipment administrator, and reduces the efficiency of authenticating the user identity.

To increase the efficiency of authenticating the user identity, an exemplary embodiment of this application provides a key authentication method, specifically including: first, determining user information from a key authentication request sent by a user end and determining whether the user information has been bound to a pre-shared key; then, when it is determined that the user information has not been bound to a pre-shared key, determining whether the initial key sent by the user end matches the first key; and if yes, registering the first pre-shared key for the user end and binding the first pre-shared key to the user information.

In the method provided in this exemplary embodiment of this application, according to the user information of the user end, the service authentication end can determine whether the current user end has been bound to a pre-shared key, and then determine to register a first pre-shared key corresponding to the user information of the user end or directly authenticate the pre-shared key. The pre-shared key in this application is registered and authenticated based on the same signal, which may avoid repeated switching between the registration signal and the authentication signal and improve the efficiency of authenticating the user identity.

Referring to FIG. 1, FIG. 1 is a flowchart of a key authentication method according to an embodiment of this application. The method may include the following steps.

S1. Determine user information from a key authentication request sent by a user end and determine whether the user information has been bound to a pre-shared key.

The method provided in this embodiment of this application may be applied to the system architecture shown in FIG. 2. The system architecture includes: a service authentication end, terminal equipment, a user end, and an access device, and the method provided in this application may be performed in the service authentication end.

The following is a brief introduction to the foregoing devices and their respective functions.

The service authentication end can be an authentication server for performing network authentication on the user end or the terminal equipment, and the authentication server is connected with the user end and responds to an authentication service request sent by the user end. The service authentication end may be a network access server, an access point (English: Access Point, AP for short), or an Ethernet switch. This is not specifically limited in this application.

The terminal equipment may be various terminals with wireless network interface cards, for example a camera, a game console, a smart TV, medical monitoring, a professional medical tablet computer, a printer or any other type of Internet of Things device, and the type and amount of terminal equipment are not specifically limited in this application.

The user end (client) can be run in the terminal equipment and can provide a local service for the user. After the initial key input by the user is received, the user end sends an authentication service request to the service authentication end to request a network service.

The access device is configured to remotely access network resources, including the access point, a router, a multiplexer, a modulator, and the like, and is configured to forward, to the service authentication end, the authentication service request sent by the user end.

Figure 3:
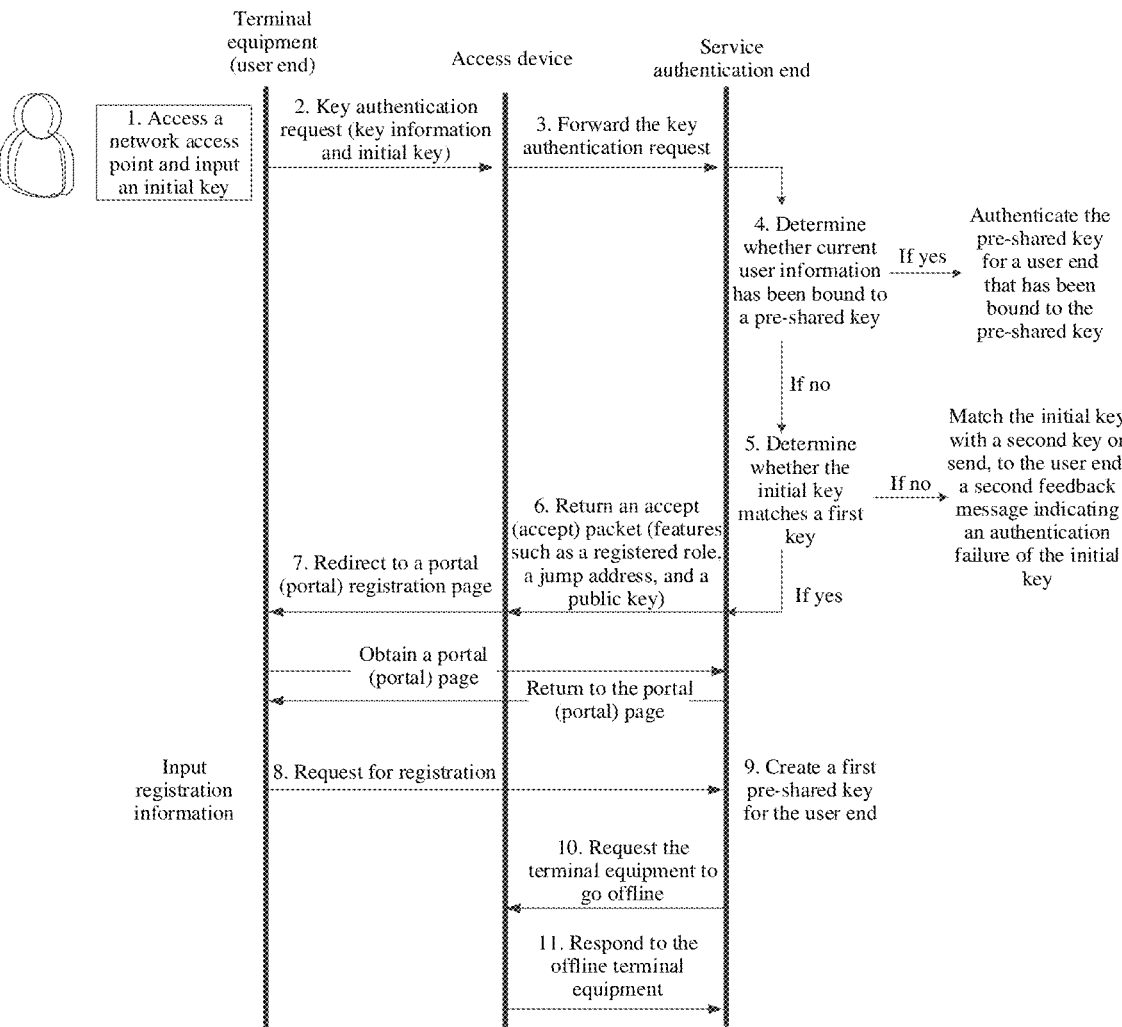
FIG. 3 is a flowchart of authentication of an initial key according to an embodiment of this application.

In this embodiment of this application, as shown in FIG. 3, first, based on a service set identifier (English: Service Set Identifier, SSID for short) signal (that is, a name of a wireless signal sent by the access device), the user determines a wireless network to be accessed. Subsequent processes of registration of the pre-shared key and authentication in this application are both performed based on the SSID signal. After determining the wireless network, the user may access the wireless network and the wireless network includes a network access point or a Wi-Fi hotspot. The user inputs the initial key on an authentication login page of the user end, and the initial key includes all registered pre-shared keys on the user end and an application key or a non-application key for registering the pre-shared key on the user end. After the user inputs the initial key, the user end can automatically send a key authentication request to the service authentication end. To perform identity authentication on the user end, the service authentication end first needs to establish a communication connection between the user end and the access device before receiving the key authentication request sent by the user end, and forwards the key authentication request to the service authentication end through the access device. In this application, the communication connection between the user end and the access device is established in a four-way handshake method, and a four-time handshake process is specifically as follows:

(1) The user end initiates an encrypted communication request to the access device.

(2) After receiving the encrypted communication request, the access device sends a feedback message to the user end.

(3) After receiving the feedback message sent by the access device, the user end verifies a certificate of the access device to determine whether to establish a communication connection with the access device.

(4) After receiving a random number sent by the user end, the access device calculates and generates a session key and sends key information to the user end, where the key information includes an encryption method (encryption rule), an encryption field, a random number, and the like.

After establishing the communication connection with the user end, the access device can receive the key authentication request sent by the user end, and then forward the key authentication request and key information to the service authentication end, so that the service authentication end authenticates the user identity. A specific authentication process is as follows:

The service authentication end determines the user information from the key authentication request. The user information may be a unique identifier for recognizing a user identity, for example a media access control address (MAC address). Based on the user information such as terminal equipment information, the service authentication end determines whether the current terminal equipment has been bound to a pre-shared key.

Based on the user information, the service authentication end can determine whether the user information has been bound to a pre-shared key. In an exemplary embodiment of this application, a mapping relationship between the user information and the pre-shared key may be established to determine whether the user information has been bound to the pre-shared key. Different user information may be bound to the same pre-shared key, namely, one pre-shared key may be used by a plurality of user ends, which increases the number of user ends. The amount of user information that may be bound to one pre-shared key is not specifically limited in this application.

When determining that the user information has been bound to a pre-shared key, the service authentication end determines that the current user end does not need to register a pre-shared key and directly authenticates the pre-shared key for the current user end. The service authentication end determines whether the initial key matches the second pre-shared key bound to the user information.

In this embodiment of this application, steps for authenticating the pre-shared key for the user end that has been bound to the pre-shared key are as follows.

The service authentication end receives the key authentication request and parses key information in the key authentication request to obtain encryption parameter values such as the encryption method (encryption rule), the encryption field, and the random number. Then the received initial key sent by the user end is used as the target pre-shared key, and the target pre-shared key is encrypted based on the encryption parameter values to obtain the first encrypted key. In this embodiment of this application, the initial key is the pre-shared key to be authenticated.

Based on the user information, the service authentication end determines, from the configured pre-shared key set, a second pre-shared key that matches the user information, and each pre-shared key in the pre-shared key set records corresponding user information. For example, pre-shared key 1 corresponds to user information 1, and pre-shared key 2 corresponds to user information 2. Details are not described herein.

After the second pre-shared key that matches the user information is determined, the second pre-shared key may be encrypted based on the same encryption parameter values as that of the target pre-shared key to obtain a second encrypted key, and then it is determined whether the first encrypted key matches the second encrypted key. Based on a first value of the first encrypted key and a second value of the second encrypted key, it may be determined whether the first encrypted key matches the second encrypted key, and when the first value is the same as the second value, it is determined that the first encrypted key matches the second encrypted key. Otherwise, it is determined that the first encrypted key does not match the second encrypted key.

When determining that the first encrypted key matches the second encrypted key, the service authentication end can send, to the access device, an authentication message related to the second pre-shared key. After receiving the authentication message related to the second pre-shared key, the access device forwards, to the user end, the authentication message related to the second pre-shared key. The authentication message may be an accept (English: Accept) packet, the accept packet includes authorization features such as authorized virtual local area network (English full name:

Virtual Local Area Network, VLAN for short) and Quality of Service (English full name: Quality of Service, QoS for short).

When determining that the first encrypted key fails to match the second encrypted key, the service authentication end can send, to the access device, a feedback message indicating an authentication error of the target pre-shared key. After receiving the feedback information indicating the authentication error of the target pre-shared key, the access device forwards, to the user end, the feedback message indicating the authentication error of the target pre-shared key. The feedback message may be a reject (English: Reject) packet. Based on the reject packet, the user end can determine an error type of the key authentication error. For example, if the error type is an input error of the initial key, the user end inputs the initial key again based on the error type and authenticates the pre-shared key again.

In the foregoing method, the service authentication end can directly authenticate the pre-shared key for the user end that has been bound to the pre-shared key, thereby improving the efficiency of authenticating the user identity.

S2. When it is determined that the user information has not been bound to a pre-shared key, determine whether the initial key sent by the user end matches the first key.

In an exemplary embodiment of this application, when determining that the user information has not been bound to a pre-shared key, the service authentication end determines whether the initial key matches the first key based on the received initial key. The first key is an application key of the pre-shared key configured by the service authentication end, and the service authentication end can determine whether the current user end has a registration need for the pre-shared key based on the first key. In an actual use scenario such as a hotel scenario, the first key may be a public key provided in a key card of a customer. The application key may be a character sequence (character string) formed by a letter and a number, for example, x123456x. A combination method of characters of the application key and the number of configured application keys are not specifically limited in this application.

Steps of using the service authentication end to determine whether the initial key matches the first key are as follows:

The key authentication request is parsed to obtain encryption parameter values such as the encryption method (encryption rule), the encryption field, and the random number.

The initial key is encrypted based on the foregoing encryption parameter values to obtain the first encrypted value. Then, one first key is selected from a first key set and it is determined whether the first key is equal to the first encrypted value. If yes, it is determined that the current user end has a registration need for the pre-shared key. If no, a next first key is selected from the first key set and the foregoing steps are repeatedly performed until each first key in the first key set is polled.

If one first key in the first key set is equal to the first encrypted value, that is, the initial key matches the first key, a first pre-shared key is registered for the user end and the first pre-shared key is bound to the user information. If no first key in the first key set is equal to the first encrypted value, that is, the initial key fails to match the first key, the initial key may be matched with the second key or a second feedback message indicating an authentication failure of the initial key may be sent to the user end.

In the foregoing method, the pre-shared key may be registered for the user end with the registration need for the pre-shared key, thereby improving the efficiency of authenticating the user identity.

S3. Register a first pre-shared key for the user end and bind the first pre-shared key to the user information.

In this embodiment of this application, when determining that the first key set includes the first key matching the first encrypted value, the service authentication end can register a first pre-shared key for the current user end, and specific steps for registering the first pre-shared key are as follows.

The service authentication end returns the accept packet to the access device, the accept packet includes authorization features such as a registered role, a name of the registered role, a jump address, and the public key, and the public key may be the same as the initial key input by the user end.

Based on the authorization features such as the registered role, the name of the registered role, and the public key in the received accept packet, the access device initiates redirection to the terminal to redirect the task to a configured portal (English: Portal) registration page. The user inputs the registration information on the portal registration page, and the registration information may include information of the user such as name, email address, and phone number information. This is not specifically limited in this application.

Based on the registration information input by the user and the configured randomized generation algorithm, the service authentication end generates the first pre-shared key for the user. The number of first pre-shared keys is not specifically limited in this application.

Figure 4:
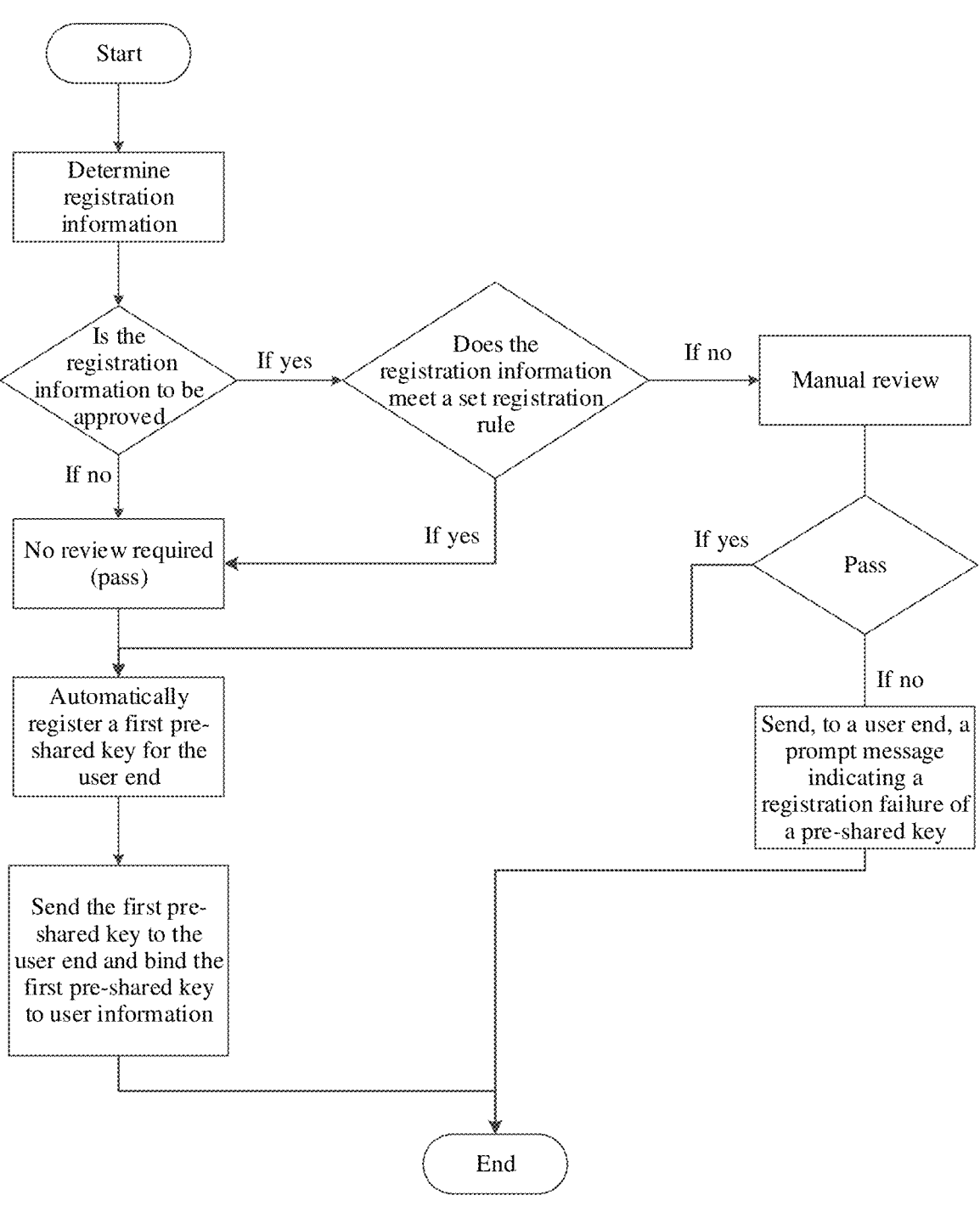
FIG. 4 is a flowchart of first pre-shared key registration approval according to an embodiment of this application.

To improve registration security for the first pre-shared key, in this embodiment of this application, when the first pre-shared key is registered for the user end, a registration approval mechanism is added for the first pre-shared key. For details of a registration approval process of the first pre-shared key, refer to FIG. 4.

The service authentication end first determines the registration information sent by the user, and then determines whether the registration information needs to be approved based on an approval mode instruction of a key authentication administrator. Specifically, an approval mode flag bit or an approval field may be configured at the service authentication end or any other method may be used to determine whether the registration information needs to be approved, and the approval mode instruction is used to modify a value in the approval mode flag bit and the approval field. Exemplarily, it is assumed that the approval mode flag bit is configured at the service authentication end, and when the value in the approval mode flag bit is 1, this indicates that the registration information needs to be approved; or when the value in the approval mode flag bit is 0, this indicates that the registration information does not need to be approved. The value in the approval mode flag bit may also be another value, and the value in the approval mode flag bit when the registration information needs to be approved is not specifically limited in this application.

When determining that the registration information needs to be approved, for example, when determining that the approval mode instruction of the key authentication administrator is to set the approval mode flag bit to 1, the service authentication end determines that the registration approval mode is to be started. First, the identity of the user end is verified, and specifically, it may be determined whether the registration information input by the user end meets the configured registration rule. For example, if a suffix name of the user in the registration information is ".DS" and the configured registration rule is to allow pre-shared key registration for only a user with a suffix name of ". DS", ". QF", or ".AB", the first pre-shared key is registered for the current user end, the first pre-shared key is sent to the user end, and the first pre-shared key is bound to the user information.

If the registration information input by the user end does not meet the preset registration rule or a suffix name of the user cannot be extracted based on the registration information, it may be determined, through manual review, whether to register the pre-shared key for the current user end. If the registration information fails the manual review, a prompt message indicating a registration failure of the pre-shared key is sent to the user end. If the registration information passes the manual review, the first pre-shared key is registered for the current user end, the first pre-shared key is sent to the user end, and the first pre-shared key is bound to the user information.

In this embodiment of this application, when the service authentication end determines that the registration information does not need to be approved, for example, when the approval mode instruction of the key authentication administrator is to set the approval mode flag bit to 0, the service authentication end determines that the identity of the current user end does not need to be authenticated. The service authentication end automatically registers the first pre-shared key for the user end, sends the first pre-shared key to the user end, and binds the first pre-shared key to the current user information.

After reviewing the pre-shared key registration corresponding to the user end, the service authentication end can send an offline request for the current user end to the access device, to request the current user end to discontinue a pre-shared key registration connection to the service authentication end and release system resources, thereby ensuring the registration of the pre-shared key for the next user end or improving authentication processing efficiency.

In the foregoing method, the user end that does not meet a requirement for pre-shared key registration may be prevented from registering the pre-shared key, and security of pre-shared key registration for the user end is improved.

In this embodiment of this application, if the initial key fails to match the first key, the service authentication end can forward, to the user end through the access device, a second feedback message indicating an authentication failure of the initial key. Based on the received second feedback message, the user end can send the initial key to the service authentication end again to apply for the registration of the pre-shared key.

In this embodiment of this application, if the initial key fails to match the first key, the service authentication end can further match the initial key with the second key.

Steps of matching the initial key with the second key are as follows.

The service authentication end determines whether the initial key matches the second key, where the second key is any pre-shared key required for network access authentication of the user end. That is, the second key is any pre-shared key in the pre-shared key set configured by the service authentication end. When determining that the initial key matches the second key, the service authentication end can bind the second key to the user information and send, to the user end, an authentication message associated with the second key. When determining that the initial key fails to match the second key, the service authentication end can forward, to the user end through the access device, a first feedback message indicating an authentication failure of the initial key.

Specific processes of determining whether the initial key matches the second key are as follows.

The service authentication end first parses the key authentication request sent by the user end to obtain the encryption parameter value, and then encrypts the initial key based on the encryption parameter value to obtain a third encrypted key, and the third encrypted key may be the same as the first encrypted key. This is not specifically limited in this application.

The service authentication end selects any candidate pre-shared key from the configured pre-shared key set, uses the candidate pre-shared key as the second key, and encrypts the second key based on the foregoing encryption parameter value to obtain a fourth encrypted key.

It is determined whether the third encrypted key matches the fourth encrypted key; and if the third encrypted key matches the fourth encrypted key, the second key is bound to the user information and an authentication message associated with the second key is sent to the user end. The authentication message associated with the second key may be the accept packet. Details are not described herein.

If the third encrypted key fails to match the fourth encrypted key, a next candidate pre-shared key is selected from the pre-shared keys, and the candidate pre-shared key is used as the second key. The second key is encrypted based on the encryption parameter value to obtain a fifth encrypted key, and it is determined whether the fifth encrypted key matches the third encrypted key. If the fifth encrypted key matches the third encrypted key, the second key is bound to the user information and the authentication message associated with the second key is sent to the user end. If the fifth encrypted key fails to match the third encrypted key, a next candidate pre-shared key is further selected from the pre-shared key set as the second key.

The initial key is compared with each candidate pre-shared key in the pre-shared key set in a polling method, which may determine whether there is a second key that matches the initial key. Although current user information is not bound to the pre-shared key, the initial key may be obtained from another user end that has registered the pre-shared key, and therefore, when determining that the initial key matches the second key, the service authentication end can bind the second key to the current user information, to realize dynamic binding of the user end to the pre-shared key in the pre-shared key authentication process, that is, to realize the function of using one pre-shared key for multiple user ends (one code for multiple users).

If no second key in the pre-shared key set matches the initial key, that is, the initial key fails to match the second key, the service authentication end can send, to the access device, a first feedback message indicating an authentication failure of the initial key. The first feedback message is a feedback message for prompting that the initial key input by the user matches neither the application key used to register the pre-shared key, nor the pre-shared key registered by another user end. After receiving the first feedback message, the access device forwards the first feedback message to the user end. The first feedback message may be a reject packet. Based on the reject packet, the user end can input the initial key again, determine to send a registration request for the pre-shared key to the service authentication end or determine to obtain the registered pre-shared key from another user end, and authenticate the pre-shared key by using the registered pre-shared key, to obtain network access authorization from the service authentication end.

In a possible embodiment, when receiving the initial key, the service authentication end can also first determine whether the initial key matches the second key. If the initial key matches the second key, the initial key is used as the registered pre-shared key, and the initial key is subjected to pre-shared key authentication. If the initial key fails to match the second key, it is further determined whether the initial key matches the first key.

If the initial key matches the first key, the first pre-shared key is registered for the current user end. If the initial key fails to match the first key, a feedback message indicating an authentication failure of the initial key is sent to the access device. A sequence of determining whether the initial key matches the first key or the second key is not specifically limited in this application.

In this embodiment of this application, for the pre-shared key authentication process of first determining whether the initial key matches the second key and then determining whether the initial key matches the first key, refer to the foregoing steps of first determining whether the initial key matches the first key and then determining whether the initial key matches the second key, and make an adaptive adjustment based on an actual application need. Details are not described herein.

In a possible embodiment, the service authentication end and the access device are combined for disposition. For example, the service authentication end and the access device are both disposed on the access point AP, and in this way, both the access and authentication functions may be realized on the same device, which implements simple deployment. The service authentication end and the access device are combined for disposition and suitable for a small-scale network.

In a possible embodiment, the service authentication end and the access device are disposed separately. One service authentication end is connected with a plurality of access devices to provide authentication services for the plurality of access devices. In this case, the PSK information is no longer configured on the access device, but is configured on the service authentication end to reduce subsequent maintenance of PSK configuration information. During expansion based on the original network, there is no need to configure the PSK information on the access device, which facilitates network expansion. In addition, the number of PSK keys that may be configured for the access device is limited, and when multiple access devices are subjected to uniform authentication of the service authentication end, the number of keys of the access device may be added to increase the number of accessed users. The service authentication end and the access device are disposed separately and suitable for a large-scale network.

In conclusion, in the method provided in the exemplary embodiments of this application, the pre-shared key may be registered and authenticated based on the same signal, which may prevent the service authentication end from repeatedly switching between a registration signal and an authentication signal when a new user obtains network access authorization in advance. A registration approval mechanism is added for the first pre-shared key, which may prevent the user end that does not meet a requirement for pre-shared key registration from registering the pre-shared key, and improve security of pre-shared key registration for the user end. The initial key is matched with each candidate pre-shared key in the pre-shared key set, which may realize a function of dynamically binding the pre-shared key to the current user information in the authentication process of the pre-shared key, increase the number of user ends to which one pre-shared key may be applied, and improve the efficiency of authenticating the user identity.

Referring to FIG. 5, FIG. 5 is a flowchart of a key authentication method according to an embodiment of this application. The key authentication method includes: S51.

Determine user information based on a key authentication request sent by a user end, where the key authentication request includes the user information and an initial key.

S52. Determine whether the initial key matches a first key, where the first key is used to determine whether the user end has a registration need for a pre-shared key.

S53. When the initial key matches the first key, register a first pre-shared key for the user end and bind the first pre-shared key to the user information.

Based on the foregoing method, the user may register based on the initial key, which may avoid manual binding of the pre-shared key to the user information in advance when the user registers, and simplify a registration process.

Based on the method provided in the foregoing embodiments, an embodiment of this application further provides a key authentication apparatus. FIG. 6 is a schematic structural diagram of a key authentication apparatus according to an embodiment of this application. The apparatus includes:

a key query module 501, configured to: determine user information from a key authentication request sent by a user end and determine whether the user information has been bound to a pre-shared key; and a key authentication module 502, configured to: when it is determined that the user information has not been bound to the pre-shared key, determine whether the initial key sent by the user end matches a first key, where the first key is used to determine whether the user end has a registration need for the pre-shared key; and if yes, register the first pre-shared key for the user end and bind the first pre-shared key to the user information.

In a possible implementation, the key authentication module 502 is specifically configured to:

determine whether the initial key matches a second key, where the second key is any pre-shared key required for network access authentication of the user end; and if yes, bind the second key to the user information and send, to the user end, an authentication message associated with the second key; or if no, send, to the user end, a first feedback message indicating an authentication failure of the initial key.

In a possible implementation, the key authentication module 502 is specifically configured to:

parse the key authentication request to obtain an encryption parameter value;

encrypt the initial key based on the encryption parameter value to obtain a third encrypted key;

select any candidate pre-shared key from the configured pre-shared key set and use the candidate pre-shared key as the second key;

encrypt the second key based on the encryption parameter value to obtain a fourth encrypted key;

determine whether the third encrypted key matches the fourth encrypted key; and if yes, bind the second key to the user information and send, to the user end, an authentication message associated with the second key; or if no, select a next candidate pre-shared key from the pre-shared key set.

In a possible implementation, when the initial key fails to match the first key, a second feedback message indicating an authentication failure of the initial key is sent to the user end.

In a possible implementation, the key authentication module 502 is specifically configured to:

determine registration information sent by the user end;

determine whether to approve the registration information; and if yes, determine whether the registration information meets a preset registration rule; and when determining that the registration information meets a registration rule, register the first pre-shared key for the user end; and send the first pre-shared key to the user end and bind the first pre-shared key to the user information; or if no, automatically register the first pre-shared key for the user end; and send the first pre-shared key to the user end and bind the first pre-shared key to the user information.

In a possible implementation, the key query module 501 is further configured to:

parse the key authentication request to obtain an encryption parameter value and use the initial key as a target pre-shared key;

encrypt the target pre-shared key based on the encryption parameter value to obtain a first encrypted key;

determine the second pre-shared key from the configured pre-shared key set;

encrypt the second pre-shared key based on the encryption parameter value to obtain a second encrypted key;

determine whether the first encrypted key matches the second encrypted key; and if yes, send, to the user end, an authentication message associated with the second pre-shared key; or if no, send, to the user end, a feedback message indicating an authentication error of the target pre-shared key.

Figure 7:
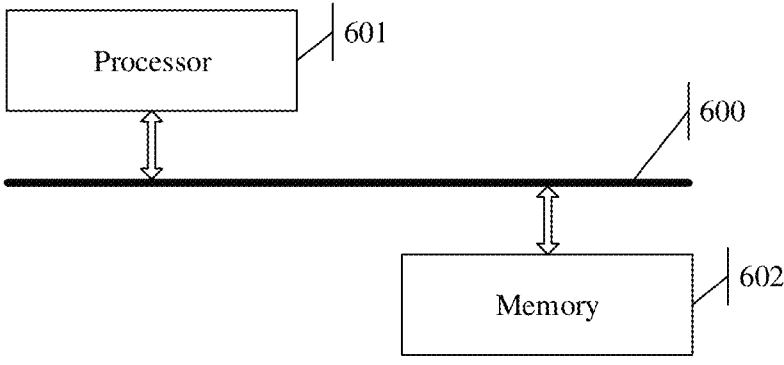
FIG. 7 is a schematic structural diagram of an electronic device according to an embodiment of this application.

Based on the same inventive concept, an embodiment of this application further provides an electronic device, where the electronic device can implement functions of the foregoing key authentication apparatus. Referring to FIG. 7, the electronic device includes:

at least one processor 601 and a memory 602 connected to the at least one processor 601. A specific connection medium between the processor 601 and the memory 602 is not limited in this embodiment of this application. In FIG. 7, for example, the processor 601 and the memory 602 are connected through a bus 600. The bus 600 is represented by a bold line in FIG. 7. A connection method between other components is described merely as an example and does not constitute a limitation. The bus 600 may be classified into an address bus, a data bus, a control bus, and the like. For ease of representation, only one bold line is used to represent the bus in FIG. 7, but this does not mean that there is only one bus or only one type of bus. Alternatively, the processor 601 may also be referred to as a controller, without a limitation on the name.

In this embodiment of this application, the memory 602 stores an instruction that can be executed by at least one processor 601, and the at least one processor 601 can perform the foregoing key authentication method by executing the instruction stored in the memory 602. The processor 601 can implement the functions of various modules in the apparatus shown in FIG. 6.

The processor 601 is a control center of the apparatus, and may connect all parts of the entire control device through various interfaces and lines, and implement various functions and data processing of the apparatus by running or executing the instructions stored in the memory 602 and invoking data stored in the memory 602, to perform overall monitoring on the apparatus.

In a possible design, the processor 601 may include one or more processing units. The processor 601 may integrate an application processor and a modem processor. The application processor mainly processes an operating system, a user interface, an application, and the like. The modem processor mainly processes wireless communication. It may be understood that the modem processor may alternatively not be integrated in the processor 601. In some embodiments, the processor 601 and the memory 602 may be implemented on one chip. In some embodiments, the processor 601 and the memory 602 may alternatively be implemented separately on separate chips.

The processor 601 may be a general-purpose processor, for example a central processing unit (CPU), a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the key authentication method disclosed with reference to the embodiments of this application may be directly performed by a hardware processor, or may be performed by using a combination of hardware and software modules in the processor.

As a non-volatile computer-readable storage medium, the memory 602 may be configured to store non-volatile software programs, non-volatile computer-executable programs, and modules. The memory 602 may include at least one type of storage medium, for example a flash memory, a hard disk, a multimedia card, a disk memory, a random access memory (English: Random Access Memory, RAM for short), a static random access memory (English: Static Random Access Memory, SRAM for short), a programmable read-only memory (English: Programmable Read-Only Memory, PROM for short), a read-only memory (English: Read-Only Memory, ROM for short), an electrically erasable programmable read-only memory (English: Electrically Erasable Programmable Read-Only Memory, EEPROM for short), a magnetic memory, a magnetic disk, and an optical disc. The memory 602 is any other medium that can be used to carry or store desired program code in a form of an instruction or a data structure and that can be accessed by a computer, but is not limited thereto. The memory 602 in this embodiment of this application may alternatively be a circuit or any other apparatus that can implement a storage function, and is configured to store program instructions and/or data.

Code corresponding to the key authentication method introduced in the foregoing embodiments may be incorporated into a chip by designing and programming the processor 601, so that when the chip runs, steps of the key authentication method in the embodiment shown in FIG. 1 may be performed. How to design and program the processor 601 is a technology well known by a person skilled in the art. Details are not described herein.

Based on the same inventive concept, an embodiment of this application further provides a storage medium, where the storage medium stores a computer instruction, and when the computer instruction runs on a computer, the computer performs the foregoing key authentication method.

In some possible embodiments, aspects of the key authentication method provided in this application may also be implemented in a form of a program product, where the program product includes program code. When the program product runs on an apparatus, the program code is used to enable a control device to perform the steps of the foregoing key authentication method described in this specification according to various exemplary embodiments of this application.

A person skilled in the art should understand that the embodiments of this application may be provided as a method, a system, or a computer program product. Therefore, this application may be implemented in a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, and an optical memory) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific method, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the other programmable device provide steps for implementing a specific function in one or more processes in the flowcharts and/or in one or more blocks in the block diagrams.

Clearly, a person skilled in the art may make various modifications and variations to this application without departing from the spirit and scope of this application. This application is intended to cover these modifications and variations of this application provided that they fall within the scope of protection defined by the following claims and their equivalent technologies.

What is claimed is:

1. A key authentication method, comprising:
   determining, by a processor, user information based on a key authentication request sent by a user end, wherein the key authentication request comprises the user information and an initial key;
   determining, by the processor, whether the initial key matches a first key based on encryption parameter values obtained by parsing the key authentication request, wherein the first key is used to determine whether the user end has a registration need for a pre-shared key; and
   when the initial key matches the first key, registering, by the processor, a first pre-shared key for the user end and binding, by the processor, the first pre-shared key to the user information;

wherein before the determining, by the processor, whether the initial key matches the first key, the method further comprises:
      determining, by the processor, whether the user information has been bound to a pre-shared key; and
   the determining, by the processor, whether the initial key matches the first key comprises:
      when the user information has not been bound to a pre-shared key, determining, by the processor, whether the initial key matches the first key.

2. The method according to claim 1, wherein after the determining, by the processor, whether the user information has been bound to the pre-shared key, the method further comprises:
   when the user information has been bound to the pre-shared key, determining whether the initial key matches a second pre-shared key bound to the user information; and
   when the initial key matches the second pre-shared key bound to the user information, sending, to the user end, an authentication message associated with the second pre-shared key.

3. The method according to claim 2, wherein the authentication message associated with the second pre-shared key comprises at least one of authorized virtual local area network information and service quality information.

4. The method according to claim 2, wherein after the determining, by the processor, whether the initial key matches the second pre-shared key bound to the user information, the method further comprises:
   when the initial key does not match the second pre-shared key bound to the user information, sending, to the user end, a feedback message indicating an authentication error of the initial key.

5. The method according to claim 4, wherein the feedback message comprises an error type of the authentication error of the initial key.

6. The method according to claim 2, wherein the determining, by the processor, whether the initial key matches the second pre-shared key bound to the user information comprises:
   determining an encryption parameter value based on the key authentication request;
   encrypting the initial key based on the encryption parameter value to obtain a first encrypted key;
   encrypting the second pre-shared key based on the encryption parameter value to obtain a second encrypted key; and
   when the first encrypted key matches the second encrypted key, determining that the initial key matches the second pre-shared key.

7. The method according to claim 1, wherein after the determining, by the processor, whether the initial key matches the first key, the method further comprises:
   when the initial key does not match the first key, determining whether the initial key matches a second key, wherein the second key is a pre-shared key in a pre-shared key set; and
   when the initial key matches the second key, binding the second key to the user information and sending, to the user end, an authentication message associated with the second key.

8. The method according to claim 7, wherein the determining whether the initial key matches the second key comprises:
   determining an encryption parameter value based on the key authentication request;

encrypting the initial key based on the encryption parameter value to obtain a third encrypted key;

obtaining the second key from the pre-shared key set;

encrypting the second key based on the encryption parameter value to obtain a fourth encrypted key; and when the third encrypted key matches the fourth encrypted key, binding the second key to the user information and sending, to the user end, the authentication message associated with the second key.

9. The method according to claim 8, wherein the determining whether the initial key matches the second key further comprises:

when the third encrypted key does not match the fourth encrypted key, selecting a next candidate pre-shared key from the pre-shared key set as the second key.

10. The method according to claim 1, further comprising:

when the initial key does not match the first key, sending, to the user end, a second feedback message indicating an authentication failure of the initial key.

11. The method according to claim 1, wherein the registering, by the processor, the first pre-shared key for the user end and binding the first pre-shared key to the user information comprises:

determining registration information sent by the user end;

when determining that the registration information meets a preset registration rule, registering the first pre-shared key for the user end; and sending the first pre-shared key to the user end and binding the first pre-shared key to the user information.

12. The method according to claim 1, wherein the registering, by the processor, the first pre-shared key for the user end comprises:

sending an accept packet to the user end, wherein the accept packet comprises at least one type of the following information: a registered role, a name of the registered role, a jump address, and a public key; and receiving the registration information sent by the user end and determining the first pre-shared key based on the registration information and a set randomized generation algorithm.

13. The method according to claim 1, further comprising:

after the registering the first pre-shared key for the user end, sending an offline request to the user end, wherein the offline request is used to request the user end to discontinue a registration connection.

14. An electronic device, comprising:

a memory, configured to store a computer program; and a processor, configured to execute the computer program stored in the memory, to implement:

determining, by the processor, user information based on a key authentication request sent by a user end, wherein the key authentication request comprises the user information and an initial key;

determining, by the processor, whether the initial key matches a first key based on encryption parameter values obtained by parsing the key authentication request, wherein the first key is used to determine whether the user end has a registration need for a pre-shared key; and when the initial key matches the first key, registering, by the processor, a first pre-shared key for the user end and binding, by the processor, the first pre-shared key to the user information;

wherein before the determining, by the processor, whether the initial key matches the first key, the method further comprises:

determining, by the processor, whether the user information has been bound to a pre-shared key; and the determining, by the processor, whether the initial key matches the first key comprises:

when the user information has not been bound to a pre-shared key, determining, by the processor, whether the initial key matches the first key.

15. A non-transitory computer-readable storage medium, wherein the computer-readable storage medium stores a computer program, and when the computer program is executed by a processor, the processor is configured to implement:

determining, by the processor, user information based on a key authentication request sent by a user end, wherein the key authentication request comprises the user information and an initial key;

determining, by the processor, whether the initial key matches a first key based on encryption parameter values obtained by parsing the key authentication request, wherein the first key is used to determine whether the user end has a registration need for a pre-shared key; and when the initial key matches the first key, registering, by the processor, a first pre-shared key for the user end and binding, by the processor, the first pre-shared key to the user information; wherein before the determining, by the processor, whether the initial key matches the first key, the method further comprises:

determining, by the processor, whether the user information has been bound to a pre-shared key; and the determining, by the processor, whether the initial key matches the first key comprises:

when the user information has not been bound to a pre-shared key, determining, by the processor, whether the initial key matches the first key.

* * * * *